Nov. 21, 1967    V. VOLKOVISKY    3,354,309
INFRARED DETECTING DEVICE OF THE THERMOPILE TYPE
Filed Dec. 18, 1964    3 Sheets-Sheet 1
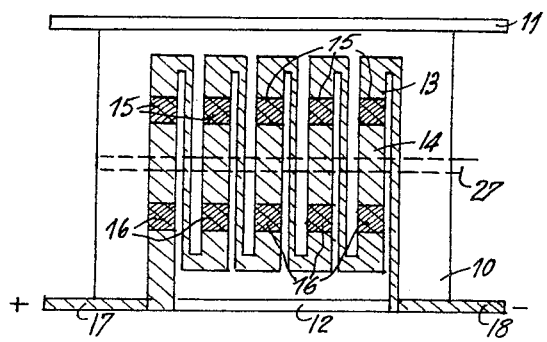
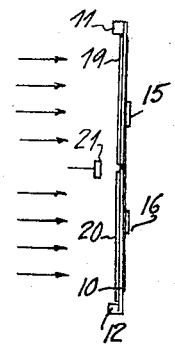
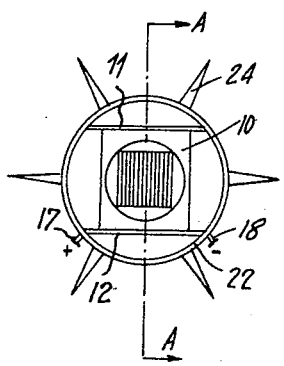
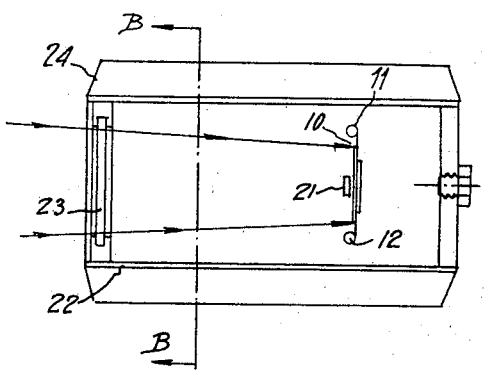
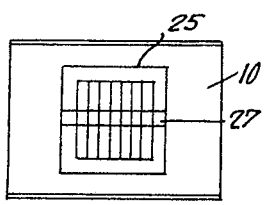
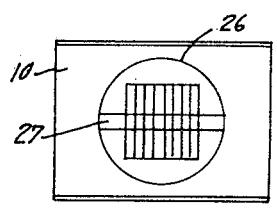
Inventor
Victor Volkovisky
by Pierce, Scheffler & Parker
atty's

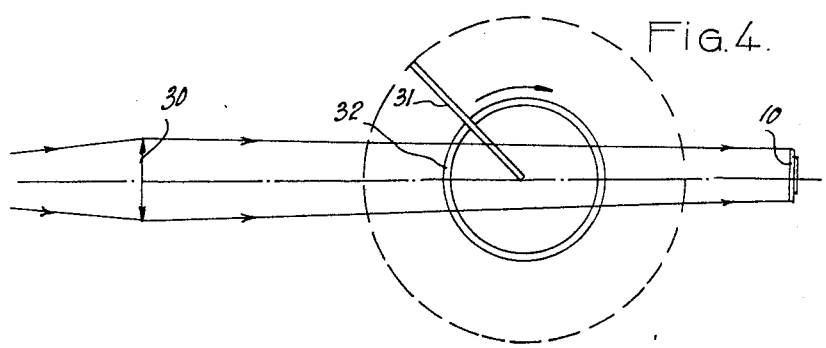
Fig. 4.
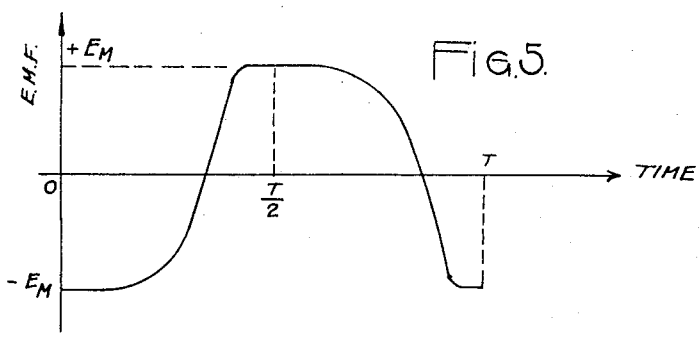
Fig. 5.
Fig. 6.
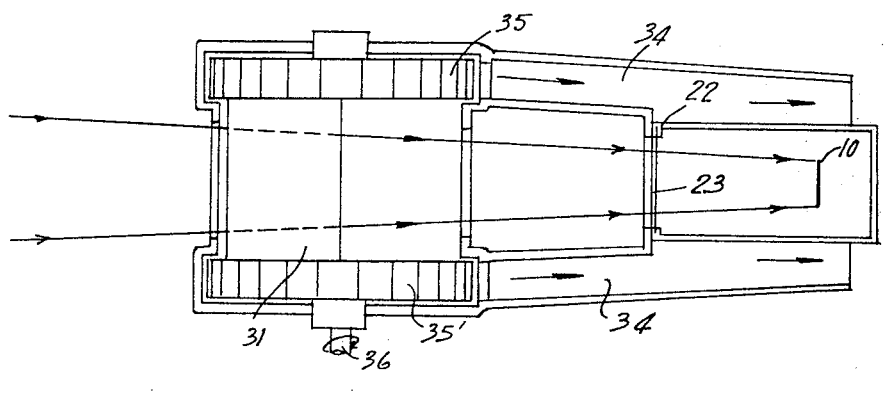
Inventor
Victor Volkovisky
by Pierce, Scheffler & Parker
atty's

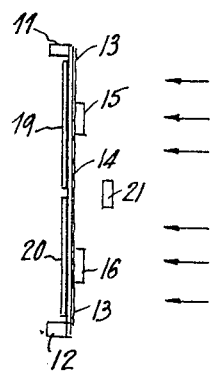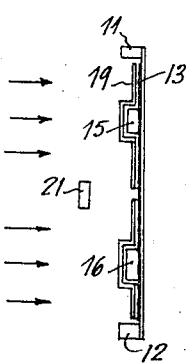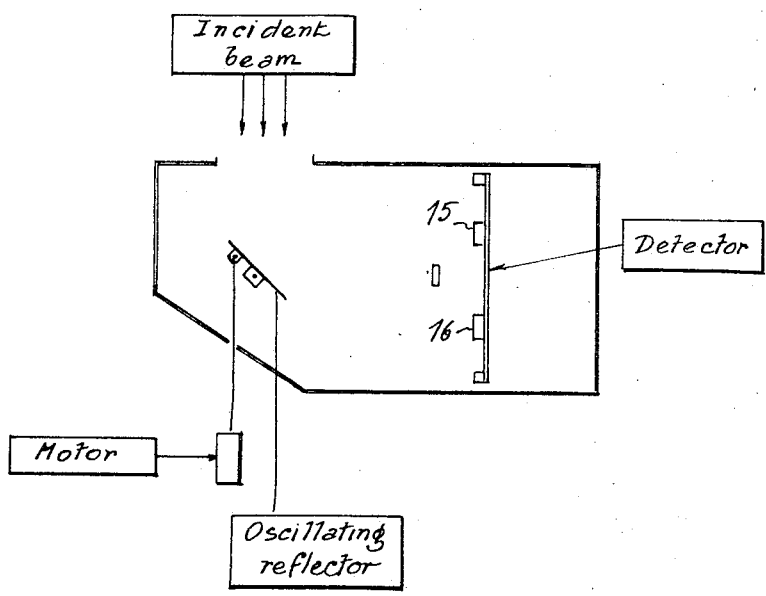

United States Patent Office 3,354,309
Patented Nov. 21, 1967

3,354,309
INFRARED DETECTING DEVICE OF THE
THERMOPILE TYPE
Victor Volkovisky, Paris, France, assignor to Compagnie
des Compteurs, Paris, France, a company of France
Filed Dec. 18, 1964, Ser. No. 419,502
Claims priority, application France Dec. 24, 1963,
958,350, Patent 1,388,025
14 Claims. (Cl. 250—83)

ABSTRACT OF THE DISCLOSURE

A detector of the thermo-pile type for measuring the flux density of a radiation comprises a base member of insulating material on which are deposited thin layers of two different alloys which are overlapped to establish hot and cold junctions of thermo-couples, these junctions being arranged in groups on opposite sides of a median line separating the irradiated surface of the detector on the base member into two halves, and connections being provided to electrically connect all of the thermo-couples additively in series. The junctions on opposite sides of the median line may be operated continuously cold and hot respectively, or a shutter arrangement may be provided so that the junctions on opposite sides of the median line are subjected to the radiation in alternation so as to develop an electrically alternating output. Means are also provided for forced cooling of the detector.

---

The present invention relates to a detecting device of the type including a thermo-pile and intended to be used in an apparatus for measuring the density of the radiation flux in the spectrum range from the visible to the remote infrared radiations and for generating a signal the mean value of which is proportional to the magnitude to be measured.

It is well known that the radiation detectors, of which the operation is based upon the photo-electric effect or luminescence, lose almost completely their sensitivity in the infra-red band for wavelengths higher than 7 microns. In practice, such detectors are no more usable in the spectrum range therebeyond.

However, the higher wavelengths are of some interest for detecting low temperature sources, and it is presently sought to use non-selective detectors whose sensitivity remains constant within a sufficiently wide band, for example thermal detectors, based upon the conversion of the energy of the infra-red radiation into calorific energy, the detector of this type which are most widely used in this technique being the thermo-piles and the bolometers.

Since the bolometers are generally used in a bridge-type circuit arrangement, the sensitivity of the measure is directly proportional to the current flowing through the variable resistor of said bridge, the variation of which varies with the radiation to which it is exposed. Owing to the fact that it is practically impossible to increase such current beyond a few milliamperes without causing said resistor to be overheated, the sensitivity which can be expected with such apparatus depends mainly upon the temperature coefficient of the resistor which is used.

Conversely, the measure of the electromotive force generated at the terminals of a thermo-pile is most often effected by a so-called zero potentiometer method, and the sensitivity may be improved by increasing the number of the series-connected thermo-piles, without the detector resistance variation affecting the accuracy of the potentiometer measure.

The present invention provides a detector of the above-mentioned thermo-pile type, having a high sensitivity and so designed that the thermal inertia and time constant thereof is as low as possible, and capable of eventually generating an alternating signal, to facilitate the amplification thereof and to simplify the measuring or utilization equipment.

The detector according to this invention is constituted by one, or several series-connected thermo-piles, made by applying a thin layer of two different alloys on an insulating base having a very small thickness, the hot and cold junctions being made by an overlapping of said two alloys, and respectively laid in groups on either side of a median line separating the detector into two halves, of which at least one is coated preferably on that face of said base which is not coated by said both alloys, with a layer of a substance having a high absorption coefficient.

Thanks to said arrangement, the radiation measure is reduced to a measure of a temperature difference, and it may be ascertained by a calculation that said difference remains independent of the ambient temperature, and that the magnitude to be measured is in proportion to the thermo-pile electromotive force.

If the incident radiation is monochromatic, the source luminence and accordingly, the temperature of said source, can be reduced from the lighting energy. Thus by interposing a monochromatic filter the apparatus can be used as a monochromatic pyrometer.

According to a second embodiment of this invention, the detector is coated on the both parts thereof with a layer of a substance having a high absorption coefficient, and each of said parts is periodically masked, and uncovered so as to be thus exposed to the incident radiation by a masking or deflecting device.

In so doing, there is obtained at the detector terminals, as explained hereinafter, an alternating electromotive force of which the effective voltage constitutes the measurable magnitude, and it may be also ascertained by a calculation that such magnitude is proportional to the density of the incident flux and is independent from the ambient temperature.

Other features of the invention will be revealed from the description which follows and the accompanying drawings which show in an illustrative and by no means limitative manner two embodiments of this invention, and in which:

FIG. 1 is a front elevation of a first embodiment of a detector according to this invention.

FIG. 1a is a side elevation corresponding to FIG. 1.

FIG. 2 is a transverse cross-section taken along the line B—B of FIG. 2a, of a bulb including the detector shown in FIGS. 1 and 1a.

FIG. 2a is a longitudinal section taken along the line A—A in FIG. 2.

FIGS. 3 and 3a are diagrammatic elevations showing two alternative manners by which the detector is irradiated.

FIG. 4 shows diagrammatically a second embodiment of a detector operating with a modulated flux.

FIG. 5 shows a curve illustrating the shape of an electric signal obtained from the detector according to FIG. 4.

FIG. 6 is a diagrammatic longitudinal section of the detector unit according to the embodiment in FIG. 4.

FIGS. 7 and 8 are side elevations like FIG. 1a, showing two alternative embodiments.

FIG. 9 is a diagrammatic view illustrating a variant of the detector.

In FIG. 1, the reference number 10 denotes an insulating base, constituted, e.g., by a film of polyethylene terephthalate known under the trademark "Mylar" having a thickness of about 1 micron, and stretched between two insulating rods 11 and 12. There has been laid on said base, preferably by evaporation under vacum (or by a cathodic spraying), along the indicated pattern, a thin layer, in the order of 0.05 to 0.1 micron, of two alloys 13, 14 which are capable of forming couples therebetween having a high thermo-electric power, for example antimony-bismuth couples having a thermo-electric power of 100 microvolts per ° C., or still couples constituted, on firstly, by an alloy comprising 99.6% of telerium and 0.4% of bismuth and, secondarily, an alloy comprising 90% of bismuth and 10% of antimony, such a couple having a thermo-electric power of 269 microvolts per ° C. The two alloys partially overlap so as to constitute, on either side of a median line separating the detector surface into two equal parts, the cold junctions 15 and the hot junctions 16 of a plurality of thermo-couples which are arranged in groups in the upper and lower halves, respectively and connected additively in series. The rod 12 is coated at the ends thereof with a gold coating adapted to form the detector output terminals 17 and 18. The upper half of base 10 containing said cold junctions 15 is coated, on the irradiated face thereof which is normally opposed to the one supporting the thermo-electric alloy coatings, with a coating 19 made from a metal having a low coefficient of absorption of the radiation, i.e. a polished metal, e.g. aluminium, while the lower half containing the hot junctions 16 is coated on its irradiated face with a thin layer 20 of a material having a high absorption coefficient to the radiation, such as platinum or gold black.

The radiation is focused by suitable optical elements on the rectangular surface 25 (FIG. 3a), or the circular surface 26 (FIG. 3b), of the insulating base 10 within which the thermo-pile is inserted. A small gap of darkness 27 separates the two areas having different radiation coefficients, said gap being obtained by a screen 21 which intercepts the incident beam widthwise along 1 to 2 mm. of the latter.

When the incident beam impinges upon the detector, it causes a balance state to be established between the energy received thereby and that which is dissipated by convection and radiation. This results in a temperature difference established between the two parts of base 10 which have different absorption coefficients one relatively to the other, and also between the alloy layers carried by said base. Said difference is independent of the ambient temperature, and its value being substantially proportional to the density of the incident energy. Consequently, an electromotive force is obtained at the detector terminals 17 and 18, which is proportional to said temperature difference, the measure of which allows then to calculate the flux density.

The detector can operate in the open air, but in order to protect the different coatings from oxidation, the detector is preferably disposed in an air-tight enclosure or bulb, as shown in section in FIG. 2. Rods 11 and 12 are secured on the metal bulb 22, which has a cylindrical shape and includes a window 23 transparent to the infra-red radiation in the involved band. This bulb is filled with an inert gas under a low pressure and, cooling fins or gills 24 are provided to dissipate the heat received by the detector as well as the heat absorbed by the gas, this insuring a low time constant. In effect, the thermal balance is reached for a constant intensity radiation when the added quantities of heat newly received per unit of time by each of the two parts of base 10 are entirely dissipated by convection and radiation and by the heat conductivity, said heat conductivity being practically limited to the heat transfer from one half of the detector to the other through the metal coating which traverse the median line of the detector.

To facilitate the signal amplification and simplify the measuring or utilization equipment, it is advisable to obtain a signal in an alternating form. Since the mere modulation of the incident flux does not permit one to obtain the periodical sign change of the electromotive force supplied by the detector, there are provided means whereby this operaiton is possible in a second embodiment of this invention. To this end, the detector is entirely coated with platinum black or gold black on both halves thereof containing the hot and cold junctions, and the incident flux impinging upon the so darkened face of the detector is periodically interrupted so that each half of the detector is alternatively exposed to the radiation.

In FIG. 4 the detector on its base 10 is shown schematically as being irradiated by an incident beam through a lens 30 which is transparent to the infra-red radiation; said beam is modulated by a rotating shutter member in the form of a blade 31 rotated by a power member 32 around an axis at right angles to the optical axis of the device. The blade length is chosen so as to be sufficiently high so that the time periods of uncoverings and maskings of one half of the beam are negligible compared to the time periods or exposition or darkness of each of the detector halves. In this manner, each of said detector halves is alternatively masked and exposed to the radiation at a frequency corresponding to the rotation speed of blade 31.

The device operates then as follows: during one half period of the blade rotation, that half of the detector which is exposed to the radiation will be "hot," while the one which is masked will be "cold," and conversely during the following half period. This results in periodically changing the polarity of the thermo-pile, and thus in generating an alternating electromotive force at the terminals thereof. The device operates in a dynamic rating fashion and if the time constant of the detector is lower than the exposure duration of one half of its surface, said electromotive force varies as a function of the time as substantially indicated by the curve in FIG. 5 wherein T represents the period, +EM the maximum electromotive force and −EM the minimum electromotive force.

Under such conditions, the measurable magnitude is then the effective value of the alternating voltage supplied by the detector, said effective value being proportional to the flux density and independent of the ambient temperature.

In some cases, it is possible, by suitably channeling the air displaced by the rotation of the masking blade alone, to obtain a sufficient cooling of the detector, or of the enclosure or bulb in which the latter is mounted. As an alternative embodiment, said bulb may be cooled by a flow of air supplied by a conventional centrifugal fan rotating about the same axis as the blade and driven by the same motor, as schematically shown in FIG. 6. The detector being on its base 10 is placed in an enclosure or bulb 22 of the above described kind but deprived of gills. The blade 31 is integral with two fan wheels 35 and 35′, disposed on either side of the longitudinal axis of the device, respectively, and the assembly is rotated by a motor of which only the output shaft 36 is shown. The air drawn in by the wheels 35 and 35′ is forced into a crown-shaped duct 34, which surrounds the detector bulb and thus insure the forced cooling thereof.

While the present invention has been described in connection with specific exemplary embodiments, it is to be understood that it is not limited thereby and that many changes may be brought thereto without going outside the scope of this invention, as defined in the accompanying claims.

In particular, the detector irradiated face may be the one on which were laid the alloys of the thermo-couples 13, 14, as shown in FIG. 7, or even said coatings as well as those of the absorbing and reflecting substances may be effected on one and the same face of the detector, as shown in FIG. 8. Also, another type of shutter may be used to alternatively irradiate each half-surface of the detector operating in a modulated flux rating fashion, for example, according to FIG. 9, wherein the incident beam is alternatively directed on an area and on another by means of an oscillating reflecting member driven by an electric motor or by an electro-magnet. The thermal-electrical elements may also be laid by any process for forming metal coatings in a thin layer on an insulating base which is of a different kind and thicker so as to insure the cooling thereof by conductivity.

I claim:
1. In a detector of the thermo-pile type for measuring the flux density of a radiation, more particularly in the spectrum range extending from the visible to the remote infra-red radiations, and generating a voltage signal having a mean value proportional to the magnitude of the radiation being measured, the combination comprising a relatively thin base member of insulating material, a thermo-pile constituted by a plurality of thermo-couples formed on said base member by a thin layer of two different alloys thereon having a high thermo-electric power, said alloy layers being overlapped to establish the hot and cold junctions of said thermo-couples, said hot and cold junctions being arranged in groups respectively on opposite sides of a median line separating the irradiated surface of said detector on said base into two halves, at least one of said halves being provided with a coating of a material having a high coefficient of absorption and means electrically connecting all of said thermo-couples additively in series.

2. A detector as defined in claim 1 wherein only one half of said base is provided with a coating of said material having a high coefficient of absorption, the other half of said base being provided with a coating of a material having a low coefficient of absorption.

3. A detector as defined in claim 1 and which further includes a screen interposed in front of said median line separating the two halves of said detector thereby to provide a region of permanent darkness therebetween.

4. A detector as defined in claim 1 wherein both halves of said base are provided with a coating of said material having a high coefficient of absorption and which further includes means for periodically exposing said high absorption coefficient material on opposite sides of said median line in alternation to the incident radiation thereby to develop from the thermo-pile of said detector an alternating electromotive force.

5. A detector as defined in claim 4 wherein said means for periodically exposing said high absorption coefficient material to the incident radiation is constituted by a shutter rotatable about an axis at right angles to the optical axis of said detector.

6. A detector as defined in claim 4 wherein said means for periodically exposing said high absorption coefficient material to the incident radiation is constituted by an oscillatory mirror.

7. A detector as defined in claim 1 and which further includes a bulb within which said detector is located, said bulb being provided with a window transparent to the involved infra-red radiation in the spectrum band, and said bulb being filled with an inert gas at a low pressure.

8. A bulb enclosed detector as defined in claim 7 wherein said bulb is provided with cooling fins.

9. A bulb enclosed detector as defined in claim 7 and which further includes forced air circulating means for cooling said bulb.

10. A bulb enclosed detector as defined in claim 9 wherein said means for forced air circulation cooling of said bulb is constituted by a shutter rotatable about an axis at right angles to the optical axis of said detector which also serves to periodically expose said high absorption coefficient material on opposite sides of said median line in alternation to the incident radiation thereby to develop from the thermo-pile of said detector an alternating electromotive force.

11. A bulb enclosed detector as defined in claim 9 wherein said means for forced air circulation cooling of said bulb is constituted by a fan mechanically linked to a shutter rotatable about an axis at right angles to the optical axis of said detector, said shutter serving to periodically expose said high absorption coefficient material on opposite sides of said median line in alternation to the incident radiation thereby to develop from the thermo-pile of said detector an alternating electromotive force, and the air from said cooling fan being discharged into a duct surrounding said detector.

12. A detector as defined in claim 1 and which further includes a monochromatic filter interposed across the incident radiation thereby conditioning said detector for use as a monochromatic pyrometer.

13. A detector as defined in claim 1 wherein said coating of a material having a high coefficient of absorption is applied to that face of said base member opposite the face on which said alloy layers are deposited.

14. A detector as defined in claim 1 wherein said coating of a material having a high coefficient of absorption and said alloy layers are applied to the same face of said base member.

References Cited
UNITED STATES PATENTS

| | | | |
|---|---|---|---|
| 2,999,933 | 9/1961 | Green | 250—83.3 |
| 3,082,325 | 3/1963 | Speyer | 250—83.3 |
| 3,164,721 | 1/1965 | Astheimer | 250—83.3 |
| 3,249,757 | 5/1966 | Kazan | 250—83.3 |

ARCHIE R. BORCHELT, *Primary Examiner.*